(12) United States Patent
Kozam

(10) Patent No.: US 8,060,059 B2
(45) Date of Patent: Nov. 15, 2011

(54) SYSTEMS AND METHODS FOR FILTERING CELLULAR TELEPHONE MESSAGES

(75) Inventor: Marc Kozam, Sandy Spring, MD (US)

(73) Assignee: Datasci, LLC, Olney, MD (US)

( * ) Notice: Subject to any disclaimer, the term of this patent is extended or adjusted under 35 U.S.C. 154(b) by 837 days.

(21) Appl. No.: 12/010,821

(22) Filed: Jan. 30, 2008

(65) Prior Publication Data

US 2008/0182556 A1    Jul. 31, 2008

Related U.S. Application Data

(60) Provisional application No. 60/898,125, filed on Jan. 30, 2007.

(51) Int. Cl.
*H04M 1/66* (2006.01)
(52) U.S. Cl. .............. 455/411; 455/412.1; 455/414.1
(58) Field of Classification Search ............ 455/411, 455/412.1, 414.1
See application file for complete search history.

(56) References Cited

U.S. PATENT DOCUMENTS

| | | | |
|---|---|---|---|
| 6,101,393 A | 8/2000 | Alperovich et al. | |
| 6,654,452 B1 * | 11/2003 | Murray et al. ............ | 379/197 |
| 6,772,143 B2 | 8/2004 | Hung | |
| 6,996,233 B2 | 2/2006 | Brokenshire et al. | |
| 7,103,372 B1 | 9/2006 | Kupsh | |
| 7,113,977 B1 | 9/2006 | Baker et al. | |
| 7,197,324 B2 | 3/2007 | Sweeney | |
| 2002/0087584 A1 | 7/2002 | Hung | |
| 2003/0046421 A1 | 3/2003 | Horvitz et al. | |
| 2003/0083078 A1 | 5/2003 | Allison et al. | |
| 2004/0088551 A1 | 5/2004 | Dor et al. | |
| 2004/0111360 A1 | 6/2004 | Albanese | |
| 2004/0181581 A1 | 9/2004 | Kosco | |
| 2005/0027802 A1 * | 2/2005 | Madsen et al. ............ | 709/204 |
| 2005/0186976 A1 * | 8/2005 | Benco et al. .............. | 455/466 |
| 2005/0191969 A1 | 9/2005 | Mousseau | |
| 2005/0197767 A1 | 9/2005 | Nortrup | |
| 2005/0204012 A1 | 9/2005 | Campbell | |
| 2006/0136419 A1 | 6/2006 | Brydon et al. | |

(Continued)

FOREIGN PATENT DOCUMENTS

EP    1093275 A2    4/2001

OTHER PUBLICATIONS

International Search Report and Written Opinion, PCT/US08/52495, dated May 21, 2008.

(Continued)

*Primary Examiner* — Patrick Edouard
*Assistant Examiner* — Justin Lee
(74) *Attorney, Agent, or Firm* — Patton Boggs LLP

(57) ABSTRACT

Systems and methods for filtering cellular messages to prevent receipt of certain messages are described. In one aspect, a computing device detects an incoming cellular telephone message for delivery to a receiver. The device filters the message by determining source identification information for the incoming cellular telephone message. The device compares this information to source identification entries in an acceptable senders list. The acceptable senders list includes source identification information corresponding to previous incoming and outgoing voice contacts by the receiver. If the source identification information for the incoming cellular telephone message is not found in the source identification entries in the acceptable senders list, the device deletes the cellular telephone message from a memory to prevent receipt of the message by the receiver.

20 Claims, 3 Drawing Sheets

U.S. PATENT DOCUMENTS

| | | |
|---|---|---|
| 2006/0168009 A1 | 7/2006 | Lyle et al. |
| 2006/0227957 A1 | 10/2006 | Dolan et al. |
| 2007/0025334 A1 | 2/2007 | Meyer |
| 2007/0032221 A1 | 2/2007 | Badt, Jr. |
| 2007/0032225 A1 | 2/2007 | Konicek et al. |
| 2007/0087765 A1 | 4/2007 | Richardson et al. |
| 2007/0202899 A1 | 8/2007 | Sweeney |
| 2007/0275739 A1* | 11/2007 | Blackburn .................... 455/466 |
| 2008/0153508 A1* | 6/2008 | Hao et al. ................... 455/456.2 |

OTHER PUBLICATIONS

Norcross, "Mobile marketing & spam," http://www.consumer-preference.com/2006/06/turnto10-local-news-block-text-spam.html, accessed Nov. 16, 2007.

Pegoraro, "Fast Forward's Help File," *Washington Post,* Dec. 2, 2007.

"The news at a glance," subheading "The bottom line," *The Week,* Nov. 30, 2007.

\* cited by examiner

SYSTEMS AND METHODS FOR FILTERING CELLULAR TELEPHONE MESSAGES

RELATED APPLICATION

This application claims priority to U.S. Ser. No. 60/898,125, filed Jan. 30, 2007 and titled "Method for Preventing Unsolicited Cell Phone Text Messages/Photos/Data", which is herein incorporated by reference its entirety.

BACKGROUND

Cellular telephone users may receive messages from any sender over a cellular telephone network. Cellular telephone messaging is a widely utilized form of communication that continues to gain in popularity. Cellular telephone messaging may encompass many different forms, including messages, data, photographs, and/or other types of information. For purposes of the present disclosure, the term "message" is intended to encompass messages, data, photographs, and/or any other types of information passed across a cellular telephone network. One form of cellular telephone message, the short message service (SMS), has particularly contributed to rapid deployment of cellular telephone messaging over wireless networks.

Cellular telephone messages attempt to mimic real-time communications by sending a message to an intended destination as quickly as possible over wireless networks. The delivery time of a cellular telephone message may be adversely affected by undesirable cellular telephone messages because undesired cellular telephone messages may occupy limited and valuable cellular telephone network resources.

As with many other forms of electronic communications, cellular telephone messaging may be abused by certain users of a wireless network. The sending of spam or other types of unsolicited communications is of particular concern in cellular telephone messaging. The cellular telephone messages may be unsolicited and the content may be annoying, offensive, or may interfere with reception of legitimate messages.

Moreover, most cellular telephone messaging services charge a per-use fee to a user for every cellular telephone message sent or received. Thus, a recipient of an undesirable cellular telephone message will incur a cost for receiving messages the user does not want.

SUMMARY

It is, therefore, an object of certain embodiments of this invention to provide methods and/or systems that having beneficial features that make them optimal for use in certain situations, such as filtering cellular telephone messages to prevent receipt of unwanted and undesirable cellular telephone messages, data, photographs and other information.

Embodiments may include a method implemented by a computing device for preventing delivery (and subsequent presentation) of certain cellular telephone messages, the method including filtering cellular telephone messages by: detecting an incoming cellular telephone message for delivery to a receiver; determining source identification information for the incoming cellular telephone message; comparing the source identification information for the incoming cellular telephone message with source identification entries in an acceptable senders list, the acceptable senders list comprising source identification information corresponding to previous incoming and outgoing voice contacts by the receiver; and if the source identification information for the incoming cellular telephone message is not found when comparing the source identification entries in the acceptable senders list, deleting the cellular telephone message from a memory to prevent delivery of the cellular telephone message to the receiver.

This Summary is provided to introduce a selection of concepts in a simplified form further described below in the detailed description. This Summary is not intended to identify key features or essential features of the claimed subject matter, nor is it intended to be used as an aid in determining the scope of the claimed subject matter. Additional features, advantages, and embodiments of the invention are set forth or apparent from consideration of the following detailed description, drawings and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate the invention and together with the detailed description serve to explain the principles of the invention. In the drawings.

DETAILED DESCRIPTION

Figure 1:
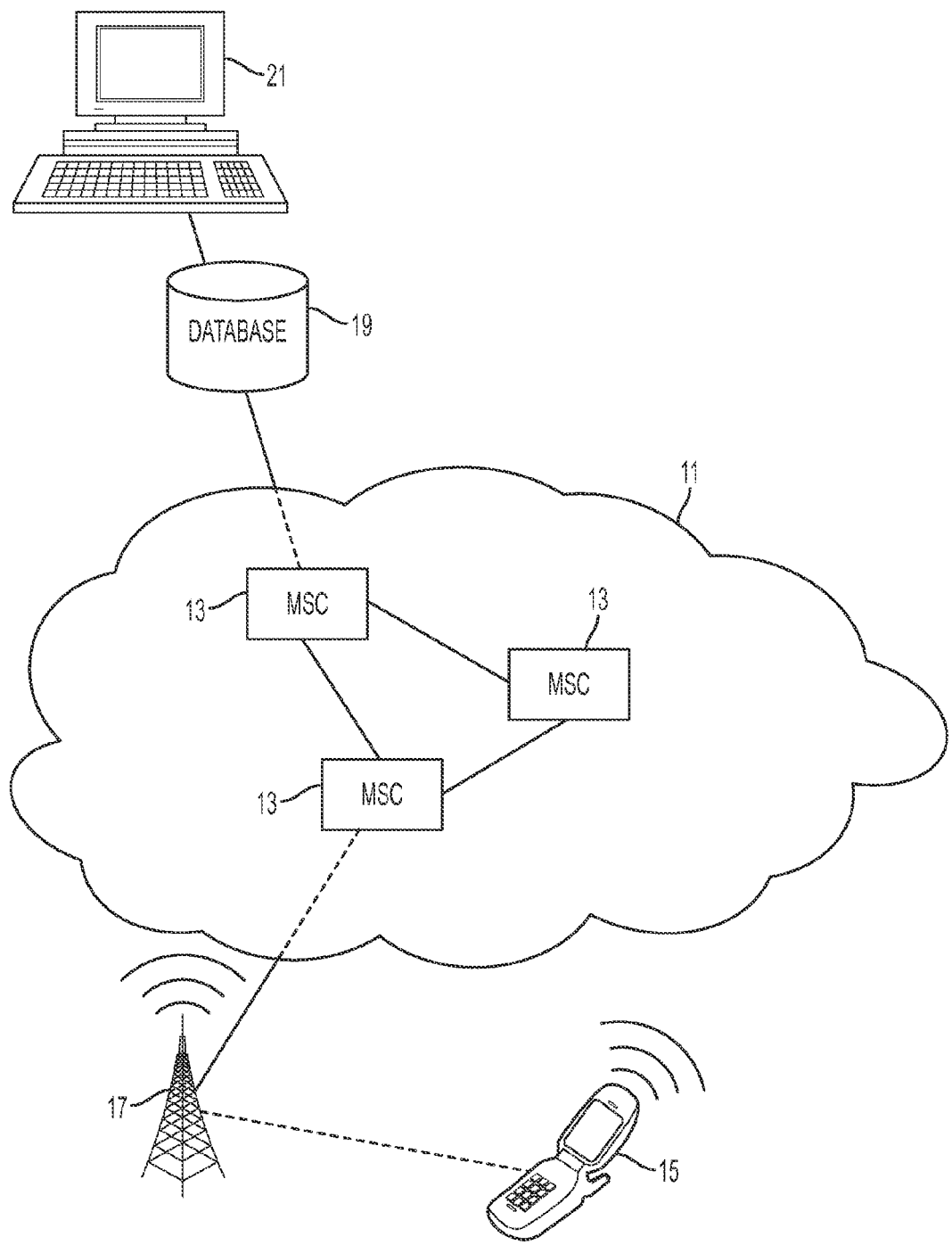
FIG. 1 is a schematic exemplary illustration of a system for filtering cellular telephone messages to prevent reception of undesired cellular telephone messages

Systems and methods are described to prevent/block unwanted or undesired cellular telephone messages, or alternatively, accept cellular telephone messages from only desirable senders. Furthermore, the systems and methods may also provide a straightforward process to add new senders to an "acceptable senders" list, perhaps without requiring any conscious user intervention whatsoever.

Cellular telephone devices are primarily used for voice communications. Voice communications are generally initiated and conducted between parties that are familiar to one another. Cellular telephones, therefore, may primarily be used to communicate with a limited number of other parties that a cellular telephone user knows and trusts. There may be frequent or at least regular contact between a cellular telephone user and those limited number of parties with which the cellular telephone user regularly communicates.

As described above, and in addition to voice communications capabilities, cellular telephone devices may receive and transmit cellular telephone messages across a cellular telephone network. In addition to a cellular telephone user having voice communications with a limited number of parties on a frequent or at least regular basis, a cellular telephone user may regularly transmit cellular telephone messages to those same limited number of parties. Many cellular telephone messages may be preceded by voice contact.

Embodiments may filter cellular telephone messages based upon previous voice contact between a cellular telephone user and a party sending a cellular telephone message. Alternatively, filtering may also include previous cellular telephone message contact between the cellular telephone user and a party sending a cellular telephone message. Cellular telephone messages may be filtered through an "acceptable senders" list that includes any party that has previously had voice contact with the cellular telephone user.

The list of "acceptable senders" may be automatically compiled through call records at a cell phone provider's switch or other data processing locations. In one embodiment, each individual user of a cellular telephone device has a personalized acceptable sender list. Acceptable sender lists may be a user-selected feature for a cellular telephone device that may be turned on and off as desired by the individual user. The automatically compiled acceptable senders list may include, for example, one or more of the following: (1) telephone numbers to which outgoing calls have been placed by the cellular telephone user, and (2) telephone numbers from which calls have been received by the cellular telephone user. Acceptable senders list may be generated and/or updated at any time and on any schedule. In one embodiment, the acceptable senders list is generated and updated in real-time.

To automatically add telephone numbers to the acceptable senders list, previous voice contacts between the cellular telephone user and other parties may need to be of adequate duration. For example, telephone numbers associated with voice contacts of less than two minutes may be disregarded when generating and updating the acceptable senders list. Alternate durations are possible and may be predetermined or user-selected. A duration requirement may eliminate "wrong numbers", i.e., parties that have dialed the user's cellular telephone device accidentally and other parties from which the user answers the cellular telephone device but may not wish to receive future cellular telephone messages, from being added to the acceptable senders list.

In one embodiment, the simple act of placing or receiving a voice contact telephone call results in a new telephone number being added to the acceptable senders list.

Automatic pruning of the acceptable senders list may occur if no contact has occurred in a defined time period with a telephone number currently on the acceptable senders list. For example, if a cellular telephone user has not called or received a call from a particular party on the acceptable senders list within the last, for example, six to twelve months, that particular party on the acceptable senders list may be removed from the acceptable senders list. Alternate durations are possible and may be predetermined or user-selected. The duration requirement may eliminate messages from any particular parties that do not have frequent contact with the user or particular parties that the user only contacted a minimum number of times for a specific purpose.

Any automatically updated acceptable senders list may be augmented by "white lists" and/or "blacklists". These lists may allow a user to manually alter the composition of their individual acceptable senders list. White lists and/or black lists may be lists manually created and maintained by each user. A white list may add parties to the acceptable senders list not placed on the acceptable senders list due to voice contacts. Possible parties that may be included in a white list may include, for example, information services that never place voice calls or parties that the user trusts but with which the user does not regularly communicate. A blacklist may list parties that may be included on the acceptable senders list, but with which the user does not want to receive cellular telephone messages. Possible parties that may be included in a black list may include, for example, previously desired contacts that have become undesirable, for example, an ex-boyfriend.

The white lists and/or black lists may be stored separately from the acceptable senders list. If stored separately, the white lists and/or black lists may be called before and/or after the acceptable senders list has been accessed by the systems and methods. For example, upon detection of a cellular telephone message, the identification information from the cellular telephone message may be compared with the acceptable senders list. The identification information may then be compared with any existing white lists and/or black lists for a final determination of whether the cellular telephone message should be delivered to the cellular telephone user.

Alternatively, the information from the white lists and/or black lists may be incorporated into the acceptable senders list. The white lists and/or black lists may still be separate, however, for purposes of storage and access by the cellular telephone user. For example, a black list may remove any undesirable contacts from the acceptable senders list such that the systems and methods only needs to access the acceptable senders list to determine whether a match exists between the identification information from the cellular telephone message and the telephone numbers in the acceptable senders list. A white list may directly add telephone numbers to the acceptable senders list.

In one embodiment, groups of telephone numbers may be blocked or allowed in addition to individual telephone numbers. For example, white lists and black lists may include groupings of telephone numbers that are added to or removed from the acceptable senders list. Groupings may include all telephone numbers with certain area codes and/or exchanges. For example, a user may add all 301 area code numbers to a black list to prevent reception of any cellular telephone messages from numbers originating from the 301 area code. Alternatively, for example, a user may add all 301 area code numbers to a white list to allow reception of any cellular telephone messages from numbers originating from the 301 area code regardless of previous voice contacts.

Embodiments may succeed because the identity of a party sending a cellular telephone message may be difficult to "forge". Identity information may be passed in an automatic number identification ("ANI") record or other identification source that is exchanged during cellular telephone call setup. Identity information may be transmitted in message header information or within the body of a message. The transmission of source identification information may prevent undesirable and/or anonymous parties from contacting the cellular telephone user. Because the identity of the party sending a cellular telephone message is known, the source identification information may be matched against the acceptable senders list, white lists and/or black lists.

FIG. 1 illustrates an exemplary system to filter cellular telephone messages. This filtering prevents receipt of certain messages (e.g., unwanted or undesirable cellular telephone messages) by an intended recipient. In this implementation, an intended recipient may be either an individual user of a cellular telephone device, an automated device or other system for receiving cellular telephone messages. A cellular telephone provider's switch and/or other hardware may be programmed to perform the methods to filter the cellular telephone messages. The system of FIG. 1 includes a wireless network 11, including all of the known components (not shown) of a wireless network, e.g., wireless switches, base stations, home location registers ("HLR"), visitor location registers ("VLR"), etc.

As shown in FIG. 1, wireless network 11 may include various message service centers ("MSCs") 13, which together constitute part of the wireless network 11. MSCs 13 are known devices that receive, route and deliver cellular telephone messages between and among cellular telephone message-capable end-unit devices for presentation to an end-user, e.g., cellular telephone message-capable mobile telephones 15. In FIG. 1, cellular telephone message-capable mobile devices 15 may communicate with the wireless network 11 and may receive cellular telephone messages via wireless network 11 through a tower or other transmitting device 17 in a normal manner.

FIG. 1 further includes a database 19 that may contain identification information, such as telephone numbers associated with cellular telephone devices 15. The various MSCs 13 of the wireless network 11 may be programmed to intercept packet data units (PDUs) containing cellular telephone messages. The MSCs 13 may inspect the PDUs for the presence of predetermined telephone numbers. The predetermined telephone numbers may be stored in the database 19 on acceptable senders lists for each individual cellular telephone user. The acceptable senders list may be maintained by and periodically updated by a system administrator using a management terminal 21 in communication with the database 19 or through other automated or manual procedures. The MSCs 13 may delete any PDUs from sources not on the acceptable senders list, effectively preventing delivery and/or receipt of undesired cellular telephone messages.

In one implementation, the MSC that first receives the cellular telephone message performs the inspection and deletion process. Thus, unwanted cellular telephone messages may be identified and deleted before they propagate further into the wireless network 11 and consume additional network resources. Alternatively, a central processor may inspect and delete undesirable cellular telephone messages.

Figure 2:
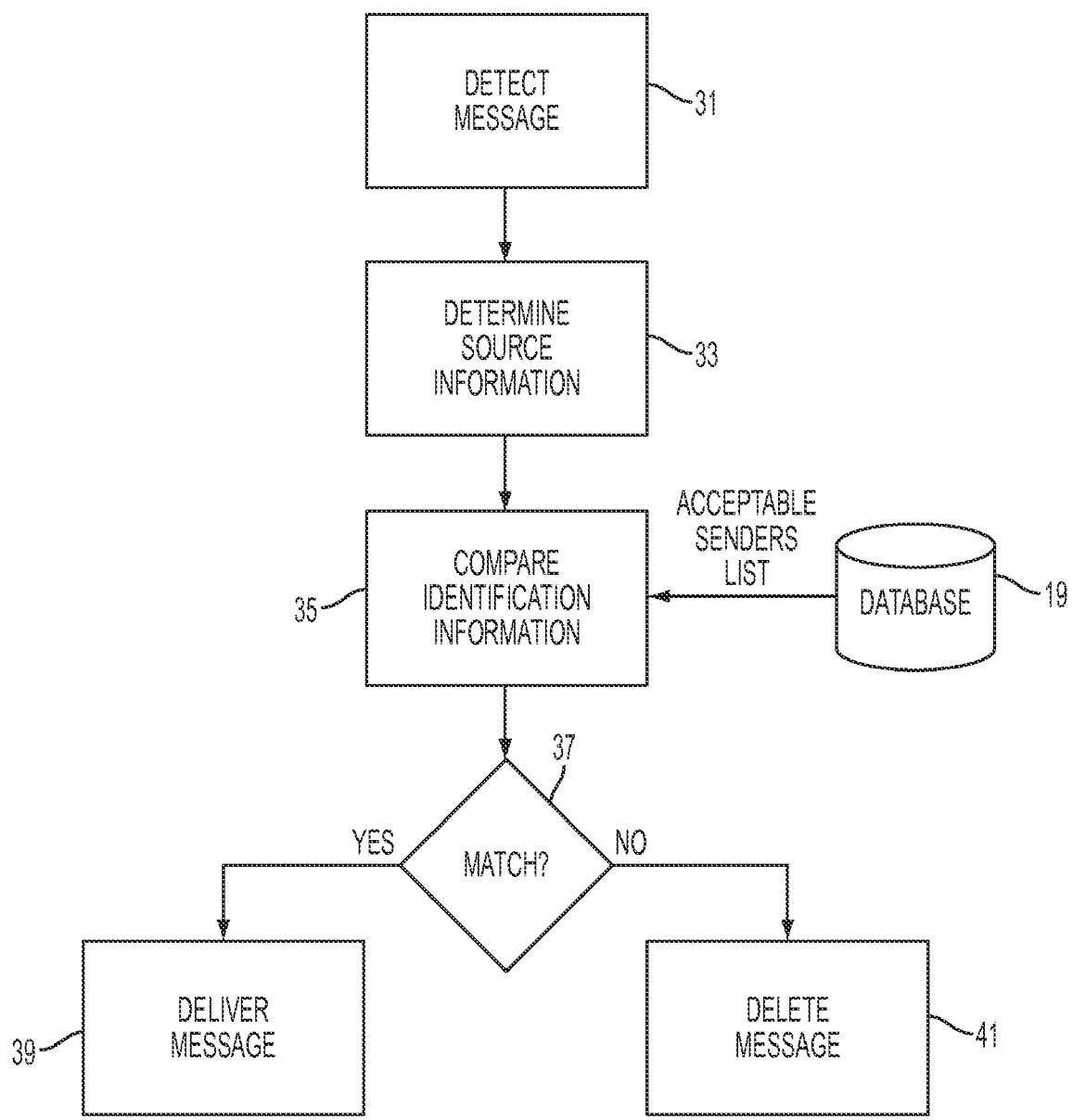
FIG. 2 is a flow chart of an exemplary detection and deletion process for a cellular telephone message.

Illustrative exemplary embodiments of an inspection and deletion process are shown in flow chart of FIG. 2. The methods described in FIG. 2 may be implemented, for example, in the MSCs 13 of the wireless network 11 illustrated in FIG. 1. The methods may require that the MSCs 13 be specially programmed to perform the operation described in FIG. 2. The required programming may be performed by one skilled in the art of programming MSCs 13 using conventional techniques. Alternately, the processing described in FIG. 2 may be performed by one or more additional preprogrammed microprocessor-based devices, e.g., a preprogrammed network server. The PDUs may be first passed through the one or more additional microprocessor-based devices for inspection and deletion, as appropriate.

The database in the methods of FIG. 2 may refer to database 19 of FIG. 1, although one skilled in the art will appreciate that, although represented as a separate single physical entity, the functionality of database 19 may be spread among multiple databases or may be combined with any of the various MSCs 13 or various other devices and components of the wireless network 11.

In the process of FIG. 2, a message is detected 31. The identification information for the source of the message is then determined 33. Identification information may be determined by the header or other sources that identify the sender.

Alternatively or additionally, the system may scan the text of the cellular telephone message to determine any further identification information. Any of the various known algorithms for searching text files for character strings having predetermined patterns may be utilized to finding telephone numbers in the text of the cellular telephone message. As an example, an algorithm for searching for seven or ten consecutive numbers or an algorithm for searching for a group of numbers separated by one or more space characters or dashes "-" may be utilized.

Moreover, cellular telephone messages may be scanned to determine the presence of personal information that may indicate that the cellular telephone message may be desirable to the receiver. For example, a cellular telephone message may be scanned and determined to contain the user's birthday within the text of the cellular telephone message. Personal information may indicate that the sender has a personal relationship with the receiver. Other personal information that may be relevant may be determined from a profile of a user and/or supplied by the user. Personal information may include information on spouses, children, pets, hobbies, addresses, etc. This cellular telephone message may be delivered to the user even if the identification information of the sender is not on the acceptable senders list. The sender's identification information may then be added to the acceptable senders list. If the sender's identification information is on a black list, however, the cellular telephone message may not be delivered even with personal information contained in the cellular telephone message. Therefore, cellular telephone messages may be screened by telephone numbers and/or other information from the text of the cellular telephone messages.

The system may then compare 35 each instance of identification information found in the cellular telephone message with the acceptable senders list from the database 19. The system may then determine if a match is found between the identification information and the acceptable senders list 37. If a match is found, the cellular telephone message is allowed to proceed to delivery 39. If no match is found, the cellular telephone message may be deleted 41. If a cellular telephone message is deleted, the system may send an error or equivalent message to the sender of the cellular telephone message informing the sender that the message has not been delivered. Additionally, the system may also inform the intended receiver that an attempt was made to send a cellular telephone message to the intended recipient. The system may also record the incident at database 19 or another location.

The system may then wait to detect another incoming cellular telephone message and repeat the steps of FIG. 2. In one implementation, multiple incoming cellular telephone messages are processed simultaneously.

Figure 3:
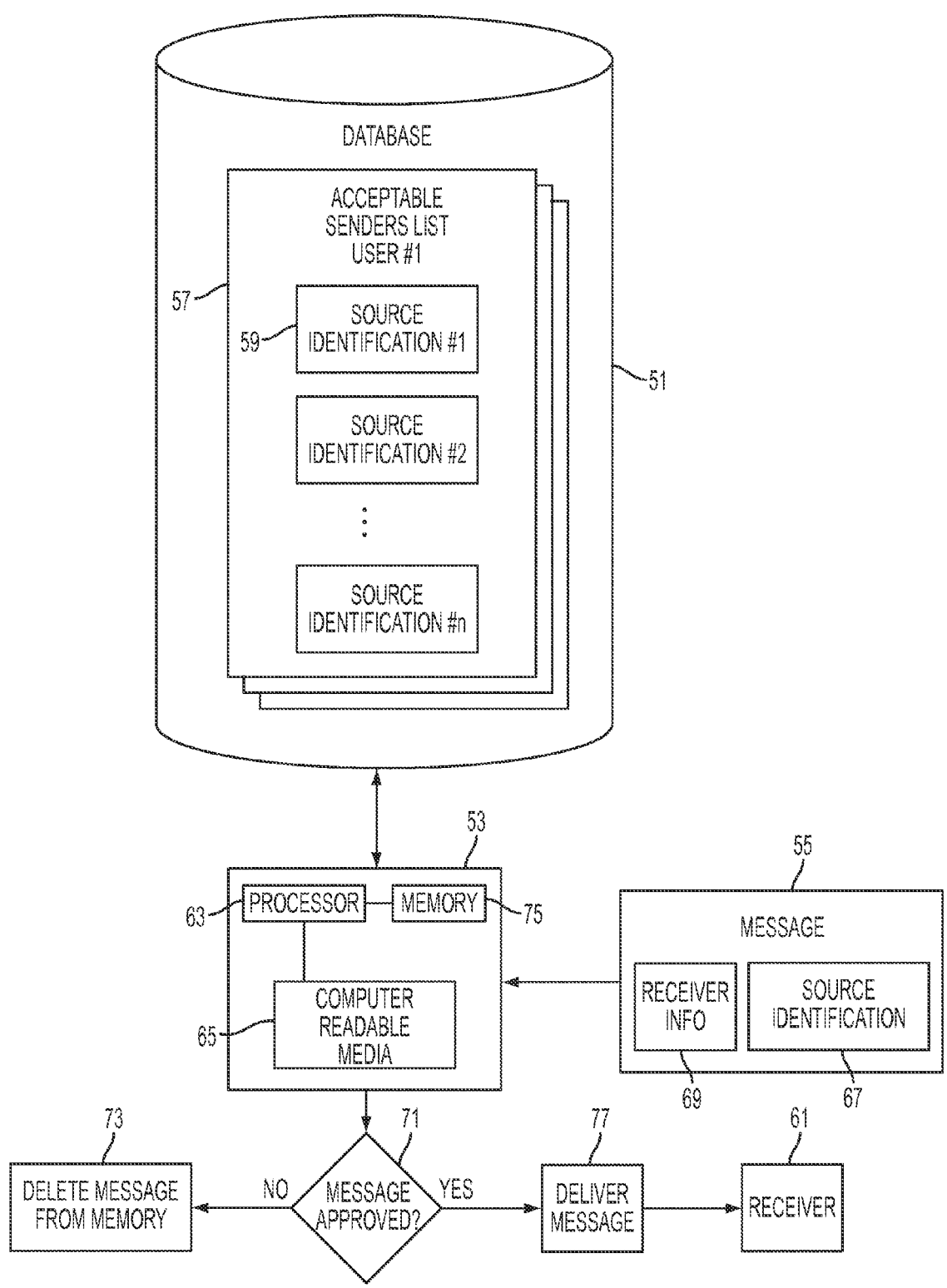
FIG. 3 is an exemplary schematic of a database and tangible computer storage device for receiving and processing a cellular telephone message.

FIG. 3 shows a database 51 and tangible, computer storage device 53 for receiving and processing a cellular telephone message 55. The database 51 may store one or more acceptable sender lists 57. The acceptable sender lists 57 may correspond to individual users of cellular telephone devices. Each acceptable sender list 57 may contain source identification information 59 corresponding to incoming or outgoing voice contacts from a receiver 61.

The database 51 may be in communication with a tangible, computer storage device 53. The computer storage device 53 may contain or be in communication with a data processor 63 and/or a computer-readable medium 65. The computer-readable medium 65 may store data and instructions to operate the methods described herein.

The message 55 may be received at the computer storage device 53 or may be transferred to the computer storage device 53 for processing. The message 55 may contain source identification information 67 for the message 55 and receiver information 69 regarding the destination for the message 55. The receiver information 69 may be used to look up an acceptable senders list 57 corresponding to the receiver information 69. The source identification 67 for the message 55 may be compared with source identification 59 for acceptable senders list 57. A message determination 71 may be made. Message determination 71 is performed by evaluating whether the source identification 67 for the message 55 is found on the acceptable senders list 57. If the source identification 67 for the message 55 is not on the acceptable senders list 57, the message 55 may be deleted 73 from a memory 75. The memory may be located within the computer storage device 53 or may be located remotely. The memory 75 may be in communication with the processor 63. In one implementation, for example, computer-readable media 65 comprises memory 75. If the source identification 67 for the message is on the acceptable senders list 57, the message 55 may be delivered 77 to the receiver 61.

The processor 63 may record delivery and/or deletion of the message 55 in the memory 75 or another memory device. Records may be accessed or processed at a later time. Results of the processing of the message 55 may be output and/or displayed to a system administrator, receiver, or other end user of the information.

The above-described exemplary embodiments of a system and method for filtering cellular telephone messages prevent delivery of certain cellular telephone messages on a wireless communications network is presented for illustrative purposes only. While this invention is satisfied by embodiments in many different forms, it is understood that the present disclosure is to be considered as exemplary and is not intended to limit the described systems and methods to the specific embodiments illustrated and described herein. Numerous variations may be made by persons skilled in the art without departure from the spirit of this description. Moreover, features described in connection with one embodiment may be used in conjunction with other embodiments, even if not explicitly stated above. The scope of the invention will be measured by the appended claims and their equivalents. The abstract and the title are not to be construed as limiting the scope of the claims, as their purpose is to enable the appropriate authorities, as well as the general public, to quickly determine the general nature of the described systems and methods. In the claims that follow, unless the term "means" is used, none of the features or elements recited therein should be construed as means-plus-function limitations pursuant to 35 U.S.C. §112, ¶6.

The invention claimed is:

1. A computer readable non-transitory data storage medium comprising computer-program instructions executable by a processor, the computer-program instructions, when executed by the processor, for implementing steps comprising:
   filtering cellular telephone messages by:
      detecting an incoming cellular telephone message for delivery to a receiver;
      determining source identification information for the incoming cellular telephone message;
      comparing the source identification information for the incoming cellular telephone message with source identification entries in an acceptable senders list, the acceptable senders list comprising source identification information corresponding to previous incoming and outgoing voice contacts by the receiver, wherein the acceptable senders list is automatically determined by call records maintained by a cellular telephone service provider, and wherein the acceptable senders list is automatically updated upon receiving notification of an incoming or outgoing voice contact by the receiver; and
      if the source identification information for the incoming cellular telephone message is not found when comparing the source identification entries in the acceptable senders list, deleting the cellular telephone message from a memory to prevent delivery of the cellular telephone message to the receiver.

2. The computer readable non-transitory data storage medium of claim 1, wherein the source identification entries in the acceptable senders list comprise source identification information corresponding to incoming and outgoing voice contacts by the receiver above a predetermined duration.

3. The computer readable non-transitory data storage medium of claim 1, wherein source identification entries in the acceptable senders list are removed from the acceptable senders list corresponding to incoming and outgoing voice contacts by the receiver not contacted within a predetermined duration.

4. The computer readable non-transitory data storage medium of claim 1, wherein the acceptable senders list further comprises additional acceptable source identification information manually entered and maintained by the receiver.

5. The computer readable non-transitory data storage medium of claim 4, further comprising adding the additional acceptable source identification information to the acceptable senders list.

6. The computer readable non-transitory data storage medium of claim 1, wherein the acceptable senders list further comprises additional undesirable source identification information manually entered and maintained by the receiver that causes deleting of the cellular telephone message.

7. The computer readable non-transitory data storage medium of claim 6, further comprising removing the additional undesirable source identification information from the acceptable senders list.

8. The computer readable non-transitory data storage medium of claim 1, further comprising providing a notification to the receiver of the deleting of the cellular telephone message.

9. The computer readable non-transitory data storage medium of claim 1, further comprising providing notification to a sender of the cellular telephone message of the deleting of the cellular telephone message.

10. The computer readable non-transitory data storage medium of claim 1, further comprising delivering the cellular telephone message if the source identification information for the incoming cellular telephone message matches an entry in the acceptable senders list.

11. A data processing system for preventing delivery of cellular telephone messages, the data processing system comprising:
   a data processing device comprising a processor and a memory; and
   wherein the data processing device:
      detects an incoming cellular telephone message,
      determines the telephone number of the incoming cellular telephone message,
      compares the telephone number of the incoming cellular telephone message with the telephone numbers of incoming and outgoing voice contacts with a receiver in an acceptable senders list comprising telephone numbers of incoming and outgoing voice contacts with the receiver, wherein the acceptable senders list is automatically determined by call records maintained by a cellular telephone service provider, and wherein the acceptable senders list is automatically updated upon receiving notification of an incoming or outgoing voice contact by the receiver,
      rejects the incoming cellular telephone message if the telephone number for the incoming cellular telephone message is not found in the acceptable senders list, and
      deletes the incoming cellular telephone message from the memory to prevent delivery of the incoming cellular telephone message to the receiver.

12. The data processing system of claim 11, further comprising a database in communication with the data processing device, and wherein the database stores the acceptable senders list.

13. The data processing system of claim 11, wherein the data processing device is located within a wireless network.

14. The data processing system of claim 11, wherein the data processing device is located at a centralized location.

15. The data processing system of claim 11, wherein the source identification entries in the acceptable senders list comprise source identification information corresponding to incoming and outgoing voice contacts by the receiver above a predetermined duration.

16. A computer readable non-transitory data storage medium comprising computer-program instructions executable by a processor, the computer-program instructions, when executed by the processor, for implementing steps comprising:
    monitoring source identification information for incoming and outgoing voice communications over a wireless network for a receiver;
    adding source identification information for the incoming and outgoing voice communications to the receiver to an acceptable senders list for the receiver;
    detecting an incoming cellular telephone message;
    determining the source identification information of the incoming cellular telephone message;
    comparing the source identification information of the incoming cellular telephone message with the source identification information in the acceptable senders list to determine matches, wherein the source identification information in the acceptable senders list comprises source identification corresponding to incoming and outgoing voice contacts by the receiver above a predetermined duration;
    rejecting the cellular telephone message if the source identification information for the cellular telephone message is not matched in the acceptable senders list; and
    deleting the cellular telephone message from a memory to prevent delivery of the cellular telephone message to the receiver.

17. The computer readable non-transitory data storage medium of claim 16, further comprising incorporating additional acceptable source identification information, manually entered and maintained by the receiver, into the acceptable senders list.

18. The computer readable non-transitory data storage medium of claim 16, further comprising removing additional undesirable source identification information, manually entered and maintained by the receiver, from the acceptable senders list.

19. The computer readable non-transitory data storage medium of claim 16, further comprising delivering the cellular telephone message if the source identification information for the incoming cellular telephone message is matched on the acceptable senders list.

20. The computer readable non-transitory data storage medium of claim 16, wherein the acceptable senders list is automatically determined by call records maintained by a cellular telephone service provider, and wherein the acceptable senders list is automatically updated upon receiving notification of an incoming or outgoing voice contact by the receiver.

* * * * *